United States Patent [19]
Singh et al.

[11] Patent Number: 5,313,397
[45] Date of Patent: May 17, 1994

[54] AUTOPILOT SYSTEM FOR A VESSEL

[75] Inventors: Harjit Singh, Hayling Island; Andrew W. Clark, Portsmouth, both of United Kingdom

[73] Assignee: Nautech Limited, Portsmouth, England

[21] Appl. No.: 652,523

[22] Filed: Feb. 8, 1991

[30] Foreign Application Priority Data

Feb. 9, 1990 [GB] United Kingdom ............... 9002949

[51] Int. Cl.$^5$ ............................................. G05D 1/00
[52] U.S. Cl. ..................................... 364/457; 318/588
[58] Field of Search ................... 364/449, 457, 571.04, 364/571.05; 318/588; 114/144 RE; 340/984, 985, 986, 987

[56] References Cited

U.S. PATENT DOCUMENTS

| 3,505,377 | 4/1970 | Hirokawa . | |
|---|---|---|---|
| 3,605,903 | 9/1971 | Wesner . | |
| 3,888,201 | 6/1975 | Zuvela | 318/588 |
| 3,919,961 | 11/1975 | McDougal | 318/588 |
| 4,031,630 | 6/1977 | Fowler . | |
| 4,038,528 | 7/1977 | Fowler | 318/588 |
| 4,091,543 | 5/1978 | Lapeyre . | |
| 4,116,057 | 9/1978 | Sullivan | 364/571.06 |
| 4,564,909 | 1/1986 | Kramer | 318/588 |
| 4,811,679 | 3/1989 | Masuzawa et al. | 364/457 |

FOREIGN PATENT DOCUMENTS

| 0189348 | 7/1986 | European Pat. Off. . |
| 0229468 | 7/1987 | European Pat. Off. . |
| 0277737 | 8/1988 | European Pat. Off. . |
| 2218517A | 11/1989 | United Kingdom . |

Primary Examiner—Thomas G. Black
Assistant Examiner—Michael Zanelli
Attorney, Agent, or Firm—Merchant, Gould, Smith, Edell, Welter & Schmidt

[57] ABSTRACT

An autopilot system for a vessel such as a boat receives a pre-set heading direction set by e.g. the user and also receives the apparent orientation (heading) from a heading sensor. The difference between the pre-set heading direction and the actual heading is then determined and a correction signal is generated in dependence on that difference, which correction signal is then used to control the orientation of the vessel by e.g. generating a rudder correction signal which varies the position of the rudder. In the present invention, the correction signal is further dependent on the difference between the actual heading and a reference direction such as magnetic North or South. In this way errors due to differences between the apparent orientation as detected by the heading sensor and the actual orientation of the vessel may be corrected. The correction value may alternatively, or in addition, be dependent on magnetic dip angle, and/or the vertical and/or horizontal component of the Earth's magnetic field, and/or latitude.

19 Claims, 4 Drawing Sheets

AUTOPILOT SYSTEM FOR A VESSEL

BACKGROUND OF THE INVENTION

1. Field of the Invention

The present invention relates to an autopilot system.

2. Summary of the Prior Art

It is now common for even relatively small boats or other vessels to have an autopilot which permits automated steering of the vessel. The autopilot maintains the boat or other vessel on a pre-set heading (orientation), which pre-set heading is compared with the heading (orientation) of the boat as determined by a heading sensor (which outputs a signal called the Compass Heading). That heading sensor may be, for example, a flux gate system such as disclosed in our European patent number 0113221.

SUMMARY OF THE INVENTION

On this basis, a Heading Error can be calculated where:

Heading Error = Compass Heading − Locked Heading

A gain is then applied to the Heading Error in order to determine the change in rudder required to correct the course. The gain is generally expressed as degrees of rudder angle per degree of Heading Error (other forms of expression can be reduced to this), so that, for example a gain of 0.1 corresponds to 0.1° of rudder for 1° of Heading Error. The difference between the required rudder position and the actual rudder position (this difference being the Rudder Position Error) can then be calculated as follows:

Rudder Position Error = (Gain × Heading Error) − Rudder Position

A suitable processing unit receives the Rudder Position Error as an input, and has processing algorithms to derive a drive signal which is applied to the drive electronics of the rudder to change the position of the rudder and so reduce the Rudder Position Error to within acceptable limits.

As described above, it would appear that, since the Heading Error can always be derived directly from the difference between the Compass Heading and Locked Heading (pre-set orientation), an autopilot system operating according to this principle should in theory be able to steer the boat or other vessel correctly. However, this has been found not to be the case; and the Heading Error is direction sensitive with the Compass Heading sometimes departing from the actual heading of the vessel especially when the vessel is turning and lateral forces are acting on the gimbals of the compass. Thus, the compass system provides an apparent orientation for the vessel. Therefore, the system for deriving the Heading Error described above does not operate correctly, because additional factors (to be discussed later) have been found to influence the Heading Error.

Therefore, according to the present invention, it is proposed the control arrangement of the autopilot system contains a suitable processing means for correcting one or more of the orientation dependent errors which occurs.

In a first aspect, the applicants have found the factor which primarily determines the compass error is the direction of the boat and this error is maximum when travelling North in the Northern Hemisphere and when travelling South in the Southeren Hemisphere. Therefore, in this first aspect the difference between the compass heading (apparent orientation) and a reference direction e.g. magnetic North or South is determined, and the heading error signal (correction value) is varied in dependence on that difference. Preferably, this is achieved by adjusting the gain of the autopilot system on the signal corresponding to the difference between the compass heading (apparent orientation) and the pre-set heading direction, in dependence on the difference between the compass heading (apparent orientation) and the reference direction.

Such an arrangement has the further advantage that it can also correct for other direction sensitive errors. As the vessel is turning, lateral acceleration causes the compass to heel, and this causes a further error in a system in which the compass heading (apparent orientation) is used directly. Such a further error increases with increasing heel angle, but again is direction sensitive, and so this error is at least partially corrected by the present invention.

Another factor which may affect the compass error is variation due to changes in the orientation of the Earth's magnetic field relative to the vessel, which can be determined in terms of variation in the magnetic dip angle, the vertical component of the Earth's magnetic field, and/or the horizontal component of the Earth's magnetic field, each of which change with changes in latitude, or can be determined approximately in terms of the latitude itself. During turning of the vessel, the compass will swing on its gimbals due to lateral acceleration and the effect of this swing will change in dependence on the magnetic dip angle and/or the vertical field component, and/or the horizontal field component and/or latitude. Therefore, since magnetic dip at various latitudes is known, it is possible for the autopilot system to store in a suitable memory the values of the dip. Alternatively, the horizontal and/or vertical field components may be measured or stored, and/or the latitude itself may be determined. Then, the heading error signal (correction value) may be varied in dependence on the dip angle and/or horizontal field component, and/or latitude. Such a variation may be performed in combination with a variation in dependence on the difference between the compass heading (apparent orientation) and the reference direction. This is particularly useful because the error due to variation in magnetic dip angle, and/or vertical field component, and/or horizontal field component, and/or latitude, is direction sensitive. However, the variation of the heading error signal (correction value) with dip angle, horizontal and/or vertical component, and/or latitude may be applied independently of direction sensitive correction and thus represents a second, independent aspect of the present invention.

A further factor which may affect the compass error is the speed of the vessel. The greater the speed, the greater the forces on the gimbal mounting of the compass due to lateral acceleration. Therefore the autopilot system of the present invention may detect the speed of the vessel and apply a corresponding variation in the heading error signal (correction value). This may be independent, or in combination with the variation due to the difference between the compass heading (apparent orientation) and a reference direction, and/or the variation dependent magnetic dip angle.

The variation of the heading error signal (correction value) in dependence on one or more of the factors of: the difference between the compass heading (apparent orientation) and a reference direction, the magnetic dip angle, and/or vertical field component, and/or horizontal field component, and/or latitude, and/or the speed of the vessel, and may be proportional to those factors. However, the variation may alternatively be stepwise. The latter is easier to achieve using digital electronics in the autopilot control system, but the former avoids sudden changes of turn rate.

In practice, the effect of the above factors may cause significant error in the direction of the vessel only when they exceed particular values related to the vessel. Therefore, it is possible for the autopilot system to operate, so that, unless these factors do exceed those values, the system operates without these direction sensitive corrections being applied.

The present invention relates to both apparatus and method aspects of the present invention.

BRIEF DESCRIPTION OF THE DRAWINGS

Embodiments of the present invention will now be described in detail, by way of example, with reference to the accompanying drawings, in which.

DETAILED DESCRIPTION

Figure 1:
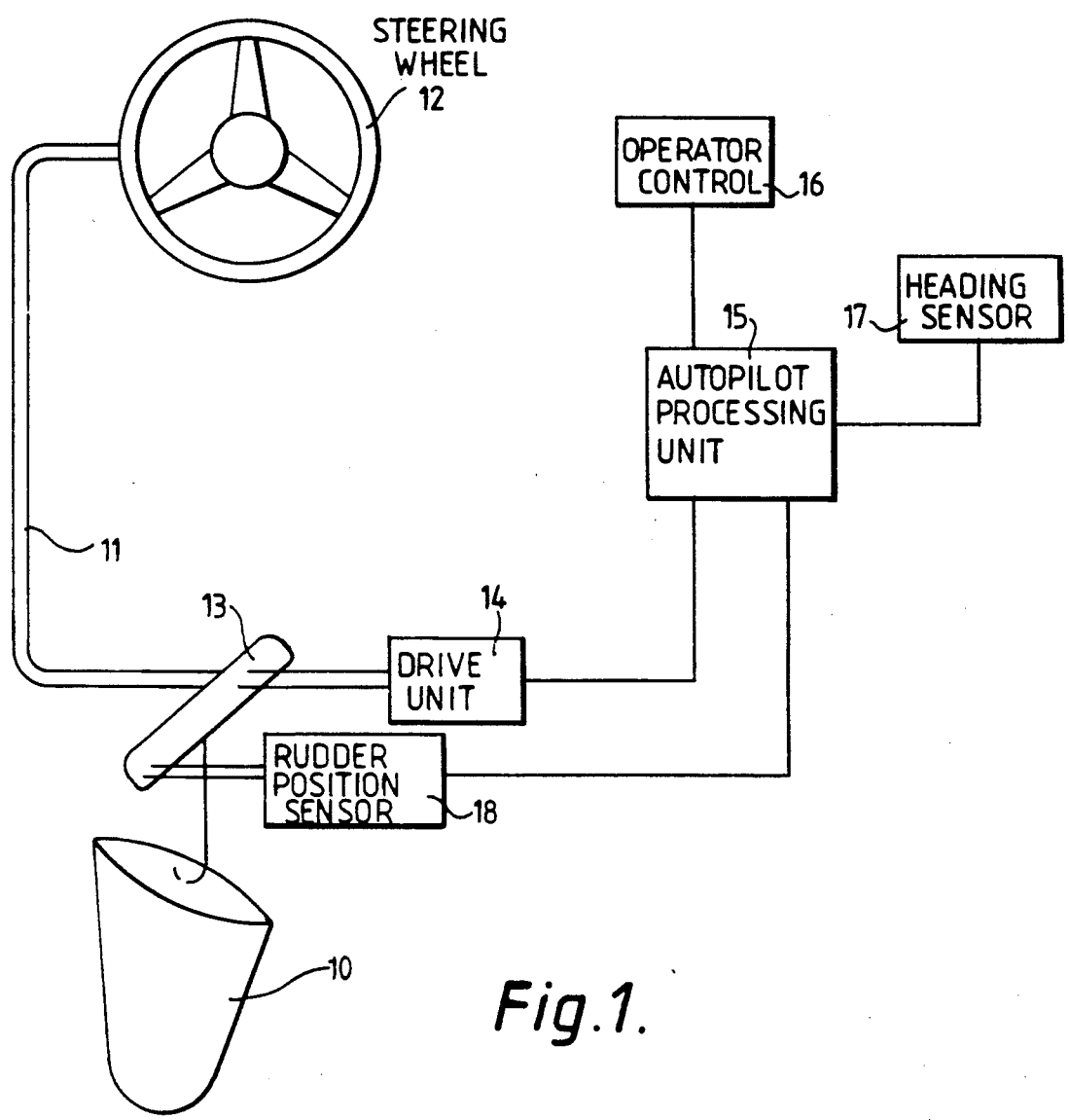
FIG. 1 is a schematic view of an autopilot system in which the present invention may be incorporated.

Referring first to FIG. 1, the rudder 10 of a vessel is connected via a suitable linkage 11 to a steering wheel 12, or other steering system, to enable the rudder 10 to be controlled manually. The link 11 can be mechanical, using rods or cables, or could be hydraulic. When the steering wheel 12 is turned, the link 11 transmits the movement to the rudder 10 and this steers the vessel. It can be noted, that for some vessels, the action of the rudder 10 is provided by swiveling the propellers themselves. As illustrated in FIG. 1, the link 11 passes via a connection 13 to the rudder 10. The connection 13 is connected to a drive unit 14, which drive unit 14 is connected to an autopilot processing unit 15. When the vessel is being steered by the autopilot, the autopilot processing unit 15 transmits signals to the drive unit 14, which moves the connection 13 so as to cause the appropriate rudder movement. In practice, the drive unit 14 will normally be a motor system, and it may also be noted that parts of the link 11 and connection 13 may be common to each other.

As illustrated, the autopilot is connected to a suitable operator control 16 which inputs commands to the autopilot processing unit 15 via suitable operator inputs. An audible alarm may be incorporated in the operator control 16. Furthermore, there is a heading sensor 17 which is a transducer generating information concerning the orientation of the vessel, and which in turn generates signals to the autopilot processing unit 15. Furthermore, signalling between the autopilot processing unit 15 and the drive unit 14 will depend on the particular electronic arrangement envisaged. For example, if motor drive amplifiers are contained within the autopilot processing unit 15, then full power signals may be transmitted directly to the drive unit 14, in which case the drive unit 14 can be relatively simple. On the other hand, if only low level signals are to be transmitted between the autopilot processing unit 15 and the drive unit 14, then full power electronics system is required in the drive unit 14.

Figure 2:
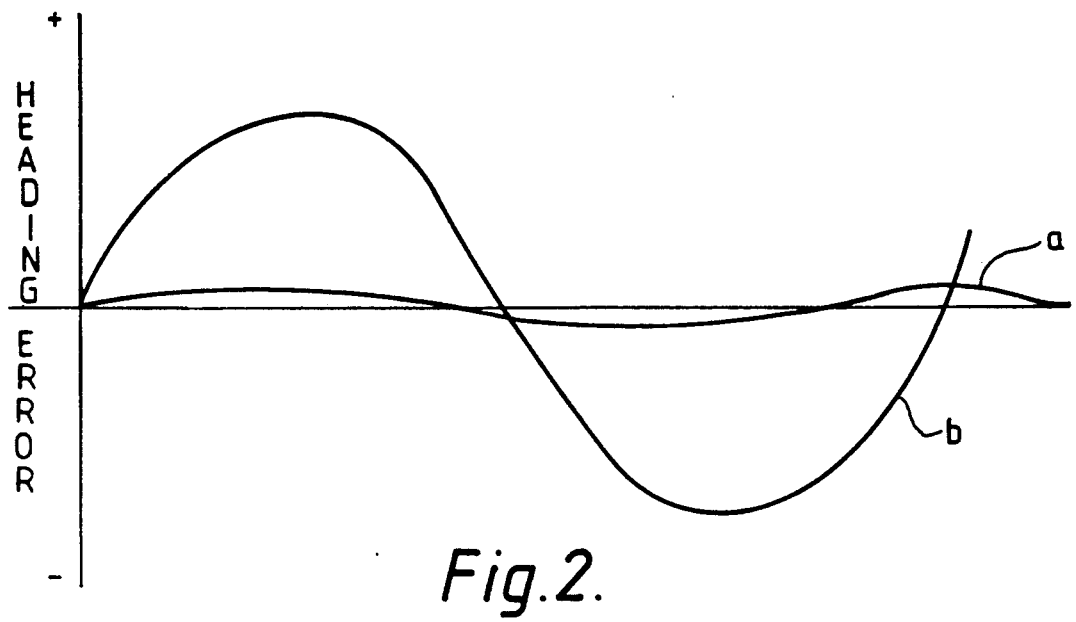
FIG. 2 shows performance curves of an autopilot in stable and unstable conditions.

The present invention is particularly concerned with the control of the rudder 10 by the processing unit 15 so as to correct errors due to the effect of the movement of the boat or other vessel on the heading sensor 17. Before describing an embodiment of the present invention in detail, however, explanation will first be given of how an autopilot system may operate in a stable or an unstable way. FIG. 2 shows two curves a, b of Heading Error with different gains. At an optimum gain setting (e.g. curve a) the course-holding ability of the autopilot is acceptable and the Heading Error is allowed to wander within an acceptable dead band. Any excursion from the dead band is quickly corrected. However if the gain is significantly greater than the optimum setting (e.g. curve b) the performance of the autopilot system is unstable, which means the Heading Error is large and could become cyclic.

Figure 3:
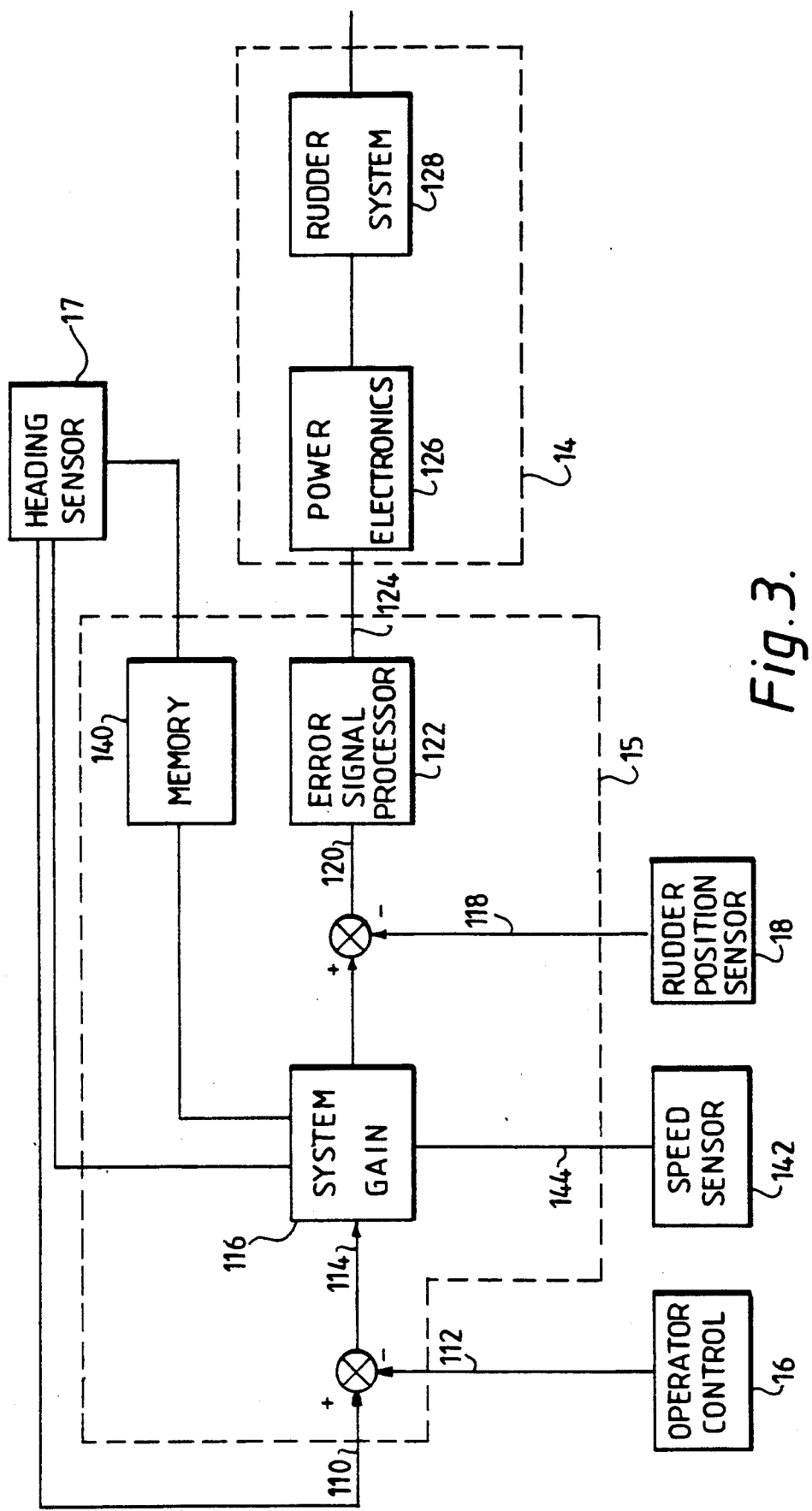
FIG. 3 is a block diagram of a part of an autopilot control loop embodying the present invention.

Referring now to FIG. 3 the autopilot processing unit 15 receives a compass heading input 110 (apparent heading) from the heading sensor 17, and a locked heading 112 (i.e. the pre-set heading) set by the operator at the operator control 16. The locked heading 112 is subtracted from the compass heading 110 to produce a heading error signal 114. The heading error signal 114 is multiplied by a system gain 116, and a signal 118 related to the rudder position derived e.g. from rudder position sensor 18, is then subtracted to generate a rudder position error signal 120. The rudder position error signal 120 is then processed by error signal processor 122 to generate a drive signal 124 which controls a power electronics system 126 which drives the rudder system 128. Of course the gain 116 can be applied at any suitable stage.

Figure 5:
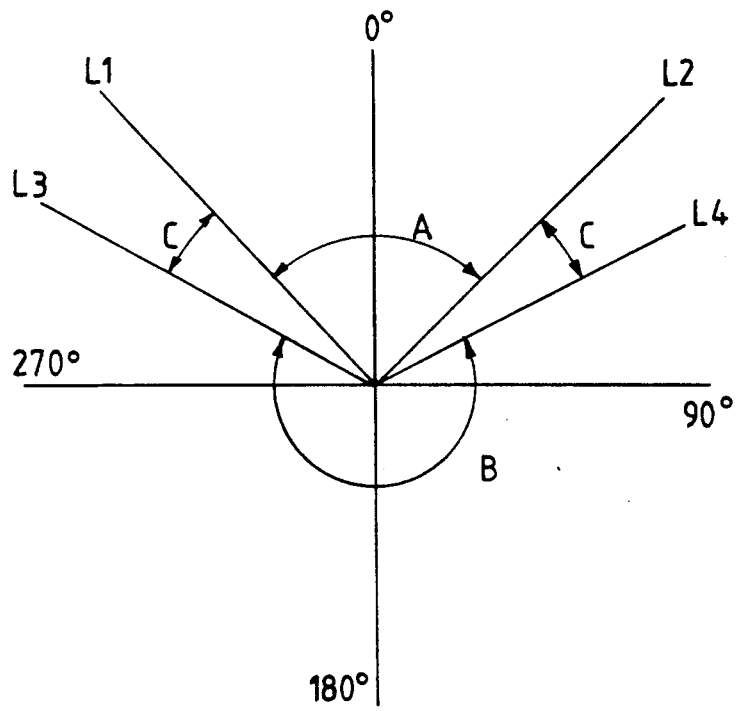
FIG. 5 shows am example of boundaries at which the autopilot system gain may be varied, with respect to the heading of the boat or other vessel.
Figure 4:
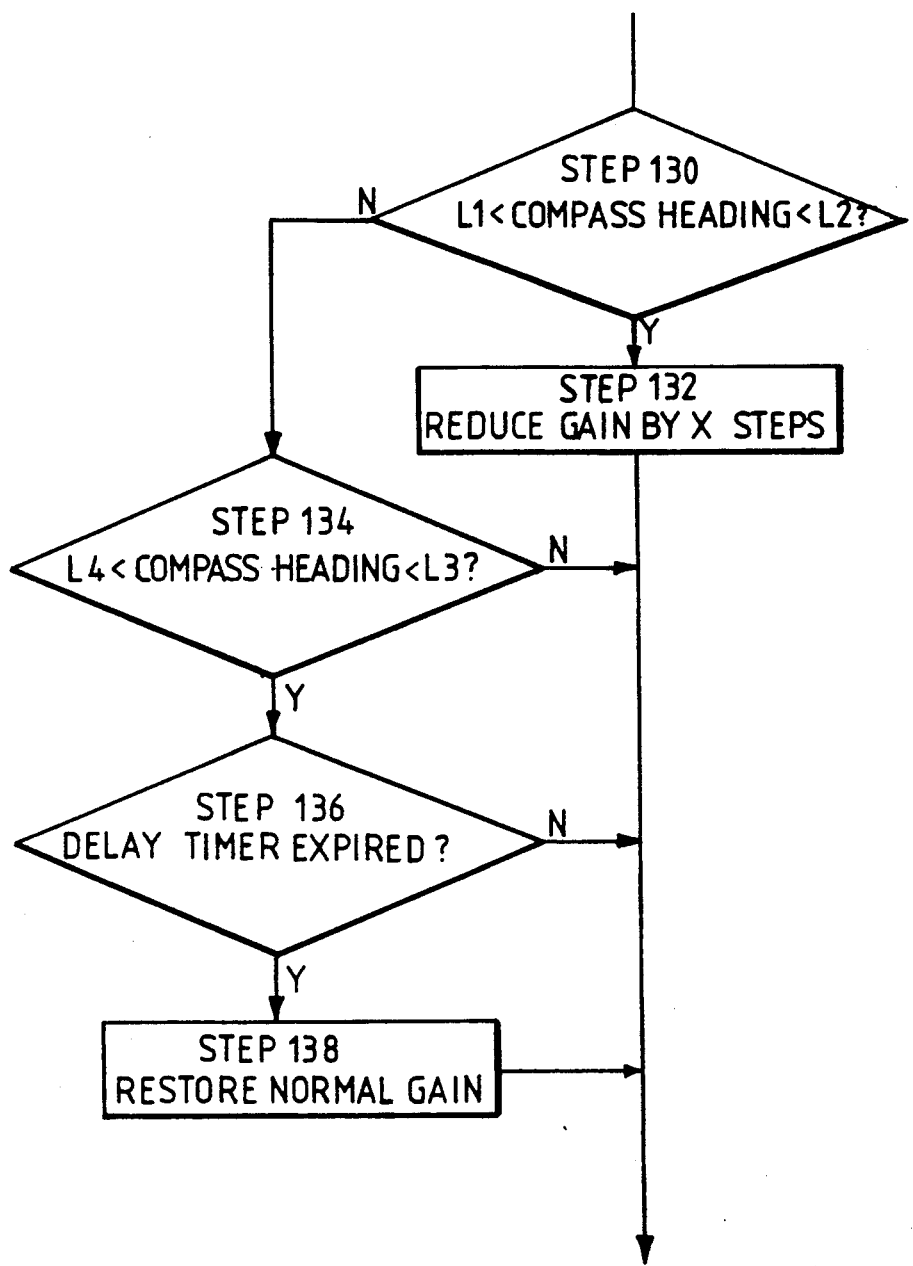
FIG. 4 is a flowchart showing part of the structure of control software used in an autopilot system embodying the present invention.

In a first embodiment of the present invention, the system gain 116 is varied in dependence on the heading of the vessel. Of course, whilst it would be desirable to provide a variation dependent on the actual heading (actual orientation) of the vessel, it is necessary to use the compass heading (apparent orientation) as only this is measurable. Referring to FIGS. 4 and 5, suppose that the vessel is sailing in a direction more than 45° away from due north, i.e. is in region B or C in FIG. 5. If the operator inputs a course change taking the vessel into region A in FIG. 5 then the step 130 in FIG. 4 will detect this fact. As shown in step 132 in FIG. 4 the gain 116 of the system is reduced by a predetermined number of steps, X. This ensures that the gain is within the range in which the system remains stable.

Now consider the situation where the vessel is turned away from the North. When the vessel's Heading enters region C, the gain is not reset (Step 134) to avoid the gain "hunting" between settings when the vessel is on a course approximately coincident with the boundary between A and C (L1 and L2). The gain 116 may not revert to normal until the heading enters region B. However the gain 116 is not necessarily immediately restored on entering region B. A time delay is imposed (step 138), so that the gain 116 is only restored (step 138)

when the rudder reverts to an approximately neutral position. This avoids an undesirable sudden change in the rudder position, which would cause a sudden change in turn rate.

Thus, in the first embodiment, the system gain 116 is varied in dependence on the direction of the vessel relative to North (or South) derived from the heading sensor 17.

In an alternative embodiment, the gain is increased and decreased gradually, rather than in steps, thus avoiding sudden change of turn rate.

In the above described embodiments the amount of gain correction applied and the regions (A,B,C) in FIG. 5 are fixed, and the autopilot system is thus limited to the geographical location for which it has been configured. In order to increase the versatility of the system in further embodiments, the gain change may be adjusted in response to other variables.

Thus, the vessel's position may be established either by being manually input or from an automatic position sensor. This may then be used to look up the magnetic dip angle from a table stored in a memory 140 of the system (Magnetic dip angle data is published by the Hydrographic Office).

Alternatively, the dip angle may be derived from information from a fluxgate heading sensing system (not shown). Such a sensor may provide information relating to the vertical component of the Earth's magnetic field from which the dip angle may be calculated. The dip angle may also be manually entered into the system. This information may then be used to adjust the system gain 116, the correction being according to predetermined algorithms.

Indeed, as mentioned previously, variation of gain in dependence on dip angle may be valuable independent of variation relative to North or South. Since dip angle is latitude dependent, the gain will then be adjusted in dependence on the geographical position of the vessel.

As was mentioned previously, a similar effect may be achieved by consideration of the horizontal component of the Earth's magnetic field, and/or the vertical component of the Earth's magnetic field, and/or the latitude, at the location of the vessel. The respective component and/or latitude may be stored in memory 140 together with a gain adjustment appropriate for different values of those components and/or for different latitudes.

The characteristics of the vessel may also be stored in the memory of the system and used to ensure a suitable gain. For instance, the speed of the vessel may be entered; high speed vessels with high turn rates require more adjustment of the gain than vessels that turn more slowly. This idea may also be embodied using a speed sensor 142 which determines the speed of the vessel and supplies a suitable signal 144 to the system gain 116, to permit variation in dependence on speed.

What is claimed is:

1. An autopilot system for a vessel, comprising:
   memory means for storing at least one pre-set heading direction;
   heading means for determining an apparent orientation of said vessel relative to a reference direction;
   steering correction means for:
   (i) generating a correction value dependent on the difference between said apparent orientation and said pre-set heading direction,
   (ii) generating a modification value dependent on the difference between said apparent orientation and said reference direction, said modification value being independent of said correction value, and
   (iii) generating a correction signal, said correction signal being the product of said correction value and a gain value, which gain value is variable in dependence on said modification value; and
   steering means for controlling the actual orientation of said vessel, said steering means including movable vessel-direction setting means for setting the actual orientation of said vessel in dependence on the current position of said movable vessel-direction setting means, and means for varying the position of said movable vessel-direction setting means in dependence on said correction signal.

2. An autopilot system according to claim 1, wherein said steering correction means is arranged to set said correction signal to zero when said difference between said apparent orientation and said pre-set heading direction is less than a predetermined value.

3. An autopilot system according to claim 1, wherein said steering correction means is arranged to vary said correction value stepwise in dependence on changes in said difference between said apparent orientation and said reference direction.

4. An autopilot system according to claim 1, wherein said steering correction means is arranged to vary said correction value in proportion to changes in said difference between said apparent orientation and said reference direction.

5. An autopilot system according to claim 1, wherein said steering correction means is arranged to vary said correction value in dependence on changes in said difference between said apparent orientation and said reference direction with a predetermined delay between the varying of said difference and the varying of said correction value.

6. An autopilot system according to claim 1, wherein said vessel has a location relative to the Earth, said location having a corresponding magnetic dip angle of the Earth's magnetic field, and said autopilot system further including means for determining the magnetic dip angle corresponding to the location of said vessel and for supplying a dip signal dependent on said magnetic dip angle to said steering correction means, and said steering correction means is arranged to vary said correction value in dependence on said dip signal.

7. An autopilot system according to claim 1, wherein said vessel has a location relative to the Earth, and said autopilot system further including means for determining the vertical component of the Earth's magnetic field corresponding to the location of said vessel and for supplying a field signal dependent on said vertical component to said steering correction means, and said steering correction means is arranged to vary said correction value in dependence on said field signal.

8. An autopilot system according to claim 1, wherein said vessel has a location relative to the Earth, and said autopilot system further including means for determining the horizontal component of the Earth's magnetic field corresponding to the location of said vessel and for supplying a field signal dependent on said horizontal component to said steering correction means, and said steering correction means is arranged to vary said correction value in dependence on said field signal.

9. An autopilot system according to claim 1, wherein said vessel has a location relative to the Earth, and said autopilot system further including means for determining the latitude corresponding to the location of said vessel and for supplying a latitude signal dependent on latitude to said steering correction means, and said steering correction means is arranged to vary said correction value in dependence in said latitude signal.

10. An autopilot system according to claim 1, further including means for determining the speed of said vessel and for supplying a speed signal dependent on said speed to said steering correction means, and said steering corrections means is arranged to vary said correction value in dependence on said speed signal.

11. An autopilot system for a vessel, said vessel having a location relative to the Earth, said location having a corresponding dip angle of the Earth's magnetic field, said autopilot system comprising:

memory means for storing at least one pre-set heading direction;

heading means for determining an apparent orientation of said vessel relative to a reference direction;

means for determining the magnetic dip angle corresponding to the location of said vessel and for generating a dip signal dependent on said magnetic dip angle;

steering correction means for:
(i) generating a correction value dependent on the difference between said apparent orientation and said pre-set heading direction,
(ii) generating a correction signal, said correction signal being the product of said correction value and a gain value, which gain value is variable in dependence on said dip signal; and steering means for controlling the actual orientation of said vessel, said steering means including movable direction vessel-setting means for setting the actual orientation of said vessel in dependence on the current position of said movable direction vessel-setting means, and means for varying the position of said movable direction vessel-setting means in dependence on said correction value.

12. An autopilot system for a vessel, said vessel having a location relative to the Earth, said autopilot system comprising:

memory means for storing at least one pre-set heading direction;

heading means for determining an apparent orientation of said vessel relative to a reference direction;

means for determining the vertical component of the Earth's magnetic field corresponding to the location of said vessel and for generating a field signal dependent on said vertical component;

steering correction means for:
(i) generating a correction value dependent on the difference between said apparent orientation and said pre-set heading direction, and
(ii) generating a correction signal, said correction signal being the product of said correction value and a gain value, which gain value is variable in dependence on said field signal; and steering means for controlling the actual orientation of said vessel, said steering means including movable vessel-direction setting means for setting the actual orientation of said vessel in dependence on the current position of said movable direction vessel-setting means, and means for varying the position of said movable direction vessel-setting means in dependence on said correction value.

13. An autopilot system for a vessel, said vessel having a location relative to the Earth, said autopilot system comprising:

memory means for storing at least one pre-set heading direction;

heading means for determining an apparent orientation of said vessel relative to a reference direction;

means for determining the horizontal component of the Earth's magnetic field corresponding to the location of said vessel and for generating a field signal dependent on said horizontal component;

steering correction means for:
(i) generating a correction value dependent on the difference between said apparent orientation and said pre-set heading direction, and
(ii) generating a correction signal, said correction signal being the product of said correction value and a gain value, which gain value is variable in dependence on said field signal; and steering means for controlling the actual orientation of said vessel, said steering means including movable vessel-direction setting means for setting the actual orientation of said vessel in dependence on the current position of said movable direction vessel-setting means, and means for varying the position of said movable direction vessel-setting means in dependence on said correction value.

14. An autopilot system for a vessel, said vessel having a location relative to the Earth, said autopilot system comprising:

memory means for storing at least one pre-set heading direction;

heading means for determining an apparent orientation of said vessel relative to a reference direction;

means for determining the latitude corresponding to the location of said vessel and for generating a latitude signal dependent on said latitude;

steering correction means for:
(i) generating a correction value dependent on the difference between said apparent orientation and said pre-set heading direction, and
(ii) generating a correction signal, said correction signal being the product of said correction value and a gain value, which gain value is variable in dependence on said latitude signal; and steering means for controlling the actual orientation of said vessel, said steering means including movable vessel-direction setting means for setting the actual orientation of said vessel in dependence on the current position of said movable direction vessel-setting means, and means for varying the position of said movable direction vessel-setting means in dependence on said correction value.

15. A method of controlling the orientation of a vessel, comprising:

storing at least one pre-set heading direction;

determining the apparent orientation of said vessel relative to a reference direction;

generating a correction value dependent on the difference between said apparent orientation and said pre-set heading direction, and generating a modification value dependent on the difference between said apparent orientation and said reference direction, said modification value being independent of said correction value;

generating a correction signal, said correction signal being the product of said correction value and a gain value, which gain value is variable in dependence on said modification value;

controlling the orientation of said vessel by varying the actual orientation of said vessel in dependence on said correction signal.

16. A method of controlling the orientation of a vessel, comprising:

storing at least one pre-set heading direction;

determining an apparent orientation of said vessel relative to a reference direction;

determining the magnetic dip angle corresponding to the location of said vessel;

generating a dip signal dependent on said magnetic dip angle;

generating:
(i) a correction value dependent on the difference between said apparent orientation and said pre-set heading direction,
(ii) a correction signal, said correction signal being the product of said correction value and a gain value, which gain value is variable in dependence on said dip signal; and controlling the orientation of said vessel by varying the actual orientation of said vessel in dependence on said correction signal.

17. A method of controlling the orientation of a vessel, said vessel having a location relative to the Earth, said autopilot system comprising:

storing at least one pre-set heading direction;

determining an apparent orientation of said vessel relative to a reference direction;

determining the vertical component of the Earth's magnetic field corresponding to the location of said vessel;

generating a field signal dependent on said vertical component;

generating:
(i) a correction value dependent on the difference between said apparent orientation and said pre-set heading direction,
(ii) a correction signal, said correction signal being the product of said correction value and a gain value, which gain value is variable in dependence on said field signal; and controlling the orientation of said vessel by varying the actual orientation of said vessel in dependence on said correction signal.

18. A method of controlling the orientation of a vessel, said vessel having a location relative to the Earth, said autopilot system comprising:

storing at least one pre-set heading direction;

determining an apparent orientation of said vessel relative to a reference direction;

determining the horizontal component of the Earth's magnetic field corresponding to the location of said vessel;

generating a field signal dependent on said horizontal component;

generating:
(i) a correction value dependent on the difference between said apparent orientation and said pre-set heading direction,
(ii) a correction signal, said correction signal being the product of said correction value and a gain value, which gain value is variable in dependence on said field signal; and controlling the orientation of said vessel by varying the actual orientation of said vessel in dependence on said correction signal.

19. A method of controlling the orientation of a vessel, said vessel having a location relative to the Earth, said autopilot system comprising:

storing at least one pre-set heading direction;

determining an apparent orientation of said vessel relative to a reference direction;

determining the latitude corresponding to the location of said vessel;

generating a latitude signal dependent on said latitude;

generating:
(i) a correction value dependent on the difference between said apparent orientation and said pre-set heading direction,
(ii) a correction signal, said correction signal being the product of said correction value and gain value, which gain value is variable in dependence on said latitude signal; and controlling the orientation of said vessel by varying the actual orientation of said vessel in dependence on said correction signal.

* * * * *